United States Patent
Straub et al.

(10) Patent No.: US 12,420,755 B2
(45) Date of Patent: Sep. 23, 2025

(54) APPARATUS AND METHOD FOR DETERMINING A ROAD FRICTION

(71) Applicant: KNORR-BREMSE Systeme fuer Nutzfahrzeuge GmbH, Munich (DE)

(72) Inventors: Kornel Straub, Pomaz (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 195 days.

(21) Appl. No.: 18/017,346

(22) PCT Filed: Jul. 2, 2021

(86) PCT No.: PCT/EP2021/068325
§ 371 (c)(1),
(2) Date: Jan. 20, 2023

(87) PCT Pub. No.: WO2022/017762
PCT Pub. Date: Jan. 27, 2022

(65) Prior Publication Data
US 2023/0182698 A1    Jun. 15, 2023

(30) Foreign Application Priority Data
Jul. 21, 2020 (EP) .................................... 20186942

(51) Int. Cl.
*B60T 8/172* (2006.01)
*B60Q 9/00* (2006.01)
(Continued)

(52) U.S. Cl.
CPC ................ *B60T 8/172* (2013.01); *B60Q 9/00* (2013.01); *B60T 8/00* (2013.01); *B60T 8/323* (2013.01);
(Continued)

(58) Field of Classification Search
None
See application file for complete search history.

(56) References Cited

U.S. PATENT DOCUMENTS 6,223,114 B1 * 4/2001 Boros ................. B60T 8/17552
701/72
6,418,369 B2   7/2002 Matsumoto et al.
(Continued)

FOREIGN PATENT DOCUMENTS

CA      2845749 A1 *  9/2014  ............ B60W 30/02
CN    116133912 A  *  5/2023  .............. B60T 8/172
(Continued)

OTHER PUBLICATIONS

Japanese-language Office Action issued in Japanese Application No. 2023-504290 dated Apr. 2, 2024 with English translation (4 pages).
(Continued)

*Primary Examiner* — Kevin R Steckbauer
(74) *Attorney, Agent, or Firm* — Crowell & Moring LLP

(57) ABSTRACT

An apparatus determines a road friction of a commercial vehicle. The commercial vehicle has a first axle and a second axle, a load distribution mechanism for changing a load on the first axle or on the second axle, and a slip sensor for determining a slip value for at least one wheel on the first axle or on the second axle. The apparatus includes an evaluation unit configured to control the load distribution mechanism to change the load of the first axle or on second axle, determine a change in the slip value in response to the change of the load, and evaluate the road friction based on the change in the slip value.

11 Claims, 2 Drawing Sheets

(51) Int. Cl.
    *B60T 8/00*        (2006.01)
    *B60T 8/32*        (2006.01)
    *B60W 40/068*      (2012.01)
    *B62D 63/04*       (2006.01)

(52) U.S. Cl.
    CPC ........ *B60W 40/068* (2013.01); *B60T 2210/12* (2013.01); *B60T 2210/30* (2013.01); *B60T 2240/02* (2013.01); *B60T 2240/06* (2013.01); *B60T 2250/00* (2013.01); *B62D 63/04* (2013.01)

(56) References Cited

U.S. PATENT DOCUMENTS

| | | | |
|---|---|---|---|
| 6,508,102 B1 | 1/2003 | Margolis et al. | |
| 6,863,462 B1* | 3/2005 | Snow | B60B 35/12 403/312 |
| 7,463,964 B2* | 12/2008 | Ushiroda | B60K 17/346 701/91 |
| 8,002,065 B2* | 8/2011 | Glavinic | B60G 17/0526 180/209 |
| 8,649,929 B2* | 2/2014 | Strasser | B60K 6/445 903/930 |
| 8,807,583 B2* | 8/2014 | Gerami-Manesch | B60G 17/0155 280/124.16 |
| 8,935,054 B2* | 1/2015 | Mantini | B60G 17/04 280/81.6 |
| 10,611,206 B2* | 4/2020 | Zawacki | B60W 10/18 |
| 10,682,994 B2* | 6/2020 | Laine | B60T 8/1708 |
| 10,960,862 B2* | 3/2021 | Flaum | B60T 8/17 |
| 11,413,970 B2* | 8/2022 | Beck | B60L 7/26 |
| 11,845,503 B2* | 12/2023 | Seeger | B60G 17/0155 |
| 2005/0085988 A1* | 4/2005 | Ushiroda | B60K 28/165 701/80 |
| 2009/0322048 A1* | 12/2009 | Glavinic | B60G 17/0165 701/37 |
| 2012/0123646 A1* | 5/2012 | Mantini | B62D 61/12 73/488 |
| 2013/0228991 A1* | 9/2013 | Gerami-Manesch | B60G 17/0155 280/124.16 |
| 2013/0325232 A1* | 12/2013 | Strasser | B60K 23/0808 903/903 |
| 2015/0329099 A1* | 11/2015 | Zawacki | B60W 10/18 701/37 |
| 2017/0361707 A1* | 12/2017 | Flogård | B60K 23/0808 |
| 2018/0319382 A1* | 11/2018 | Laine | B60T 8/1761 |
| 2019/0054905 A1 | 2/2019 | Doray et al. | |
| 2019/0054907 A1* | 2/2019 | Skrabak | B60T 8/1766 |
| 2019/0299946 A1 | 10/2019 | Miller, Jr. et al. | |
| 2020/0094799 A1* | 3/2020 | Flaum | B60T 8/17 |
| 2020/0094843 A1* | 3/2020 | Bärecke | B60W 40/068 |
| 2021/0053448 A1* | 2/2021 | Beck | B60W 50/00 |
| 2022/0306117 A1* | 9/2022 | Laine | B60T 8/1725 |
| 2022/0388586 A1* | 12/2022 | Seeger | B62D 61/125 |
| 2023/0023411 A1* | 1/2023 | Laine | B60T 8/323 |
| 2023/0182698 A1* | 6/2023 | Straub | B60T 8/1708 701/71 |
| 2023/0391302 A1* | 12/2023 | Carbone | B60T 8/885 |
| 2023/0415746 A1* | 12/2023 | Ghandriz | B60W 50/06 |
| 2024/0109423 A1* | 4/2024 | Sujan | B60L 7/18 |

FOREIGN PATENT DOCUMENTS

| | | | | |
|---|---|---|---|---|
| DE | 10 2010 048 927 A1 | | 4/2011 | |
| EP | 3371014 B1 | * | 12/2019 | ............ B60T 8/1708 |
| EP | 3943350 A1 | * | 1/2022 | ............ B60T 8/172 |
| EP | 3943350 B1 | * | 12/2023 | ............ B60T 8/323 |
| EP | 4072912 B1 | * | 3/2024 | ............ B60T 8/329 |
| JP | 2023505501 A | * | 2/2023 | ............ B60T 8/323 |
| JP | 7235426 B2 | * | 3/2023 | .......... B60W 40/068 |
| JP | 2023534717 A | * | 8/2023 | ............ B60T 8/323 |
| JP | 7411805 B2 | * | 1/2024 | ............ B60T 8/329 |
| JP | 7534527 B2 | * | 8/2024 | ............ B60Q 9/00 |
| KR | 20220106806 A | * | 7/2022 | ............ B60T 8/329 |
| KR | 20230038766 A | * | 3/2023 | ............ B60T 8/172 |
| WO | WO-2017076435 A1 | * | 5/2017 | ............ B60T 8/1761 |
| WO | WO-2017076908 A1 | * | 5/2017 | ............ B60T 8/1763 |
| WO | WO-2021115565 A1 | * | 6/2021 | ............ B60T 8/329 |
| WO | WO-2022017762 A1 | * | 1/2022 | ............ B60T 8/172 |

OTHER PUBLICATIONS

International Search Report (PCT/ISA/210) issued in PCT Application No. PCT/EP2021/068325 dated Sep. 10, 2021 (two (2) pages).

Written Opinion (PCT/ISA/237) issued in PCT Application No. PCT/EP2021/068325 dated Sep. 10, 2021 (six (6) pages).

Extended European Search Report issued in European Application No. 20186942.7 dated Nov. 20, 2020 (eight (8) pages).

* cited by examiner

APPARATUS AND METHOD FOR DETERMINING A ROAD FRICTION

BACKGROUND AND SUMMARY

The present invention relates to an apparatus and a method for determining a road friction of a commercial vehicle and, in particular, to an estimation method of road friction by changing axle loads.

An estimation of the road friction at various driving situations is needed for safety reasons. In particular, autonomously driven vehicles need to determine the road friction reliably, for example to automatically control braking and/or steering actuation based thereon. Likewise, vehicle chassis control systems rely on a correct road friction to operate correctly. There is a particular demand of having systems for determining the road friction that do not need additional sensors being installed on the vehicle, but that rely on already available sensor devices.

However, it is difficult to determine the road friction during normal driving situations, where the acceleration and/or braking is far from their limits. Typically, only in critical situations, wherein the adhesion force between the wheels and the road is about to be lost, can the road friction be determined reliably. During normal driving situations, however, the friction utilization represents only a fraction of the available friction to drive the vehicle safely.

A conventional method for determining the road friction is disclosed in U.S. Pat. No. 6,508,102, wherein the estimation of the road friction is based on conventional sensors in the vehicle. Another conventional method is described in U.S. Pat. No. 6,418,369, wherein the road friction is estimated in a steady state of the vehicle, where a driving force and a corresponding braking force is applied at the same time. This method, however, bears many risks. For example, when the front axle is braked while a rear axle is driven, there is the risk that the vehicle breaks out.

Therefore, there is still a demand for improvements in the determination of the road friction, in particular, during normal driving situations without bringing the vehicle into a dangerous situation.

At least some of the problems of the conventional systems as described before are overcome by an apparatus and a method according to the independent claims. The dependent claims refer to further advantageous realizations of the subject matter of the independent claims.

The present invention relates to an apparatus for determining a road friction of a commercial vehicle. The commercial vehicle comprises a first axle and a second axle, a load distribution mechanism for changing a load on the first axle and/or the second axle, and a slip sensor for determining a slip value for at least one wheel on the first axle and/or on the second axle. The apparatus comprises an evaluation unit configured:

to control the load distribution mechanism to change the load of the first and/or on the second axle;
to determine a change in the slip value in response to the change of the load; and
evaluate the road friction based on the change in the slip value.

The load distribution mechanism may include or be realized in the form of a lifting mechanism utilizing additional lifting air bellow. But it may also be implemented by an off-loading or a load distribution based on a change in a pressure in normal air bellows (e.g. for an air-suspension system used in the vehicle) and does not need to have additional air bellows for lifting, i.e. for detaching the corresponding wheels from the ground. Such systems can be used on tractor and/or trailer units.

In addition, the first and second axles may be part of an axle group and can be front or rear axles (as long as the vehicle has more than two axles). It should be stressed that the vehicle can be a tractor or a trailer or a combination thereof, wherein multiple axles may even be present in the front axle group of a drawbar trailer.

The road friction may be the friction coefficient or the friction force, which are proportional to each other. If the mass load on the corresponding wheel is known, both quantities are physically equivalent. The road friction may also be any derived quantity that depends on the friction coefficient. These quantities can be determined at best, if the limit (maximum) of the adhesion friction is determined. Therefore, optionally, the evaluation unit is further configured to change the load on the first and/or on the second axle until criticality occurs which is characterized by a transition between adhesion friction and sliding friction on at least one wheel on the second axle.

The slip may be caused by a braking and/or an acceleration, i.e. may be caused by positive torque (e.g. driving torque) or negative torque (e.g. braking torque) acting one or more wheels on the corresponding axles. The slip or its change may be determined by detecting the rotation speed of the wheels (or its change) and compare it with the speed of the vehicle. Moreover, the slip depends on the road friction and thus the road friction can be determined from a detected slip value. The corresponding dependency can be stored in the evaluation unit or somewhere else in the vehicle and may be obtained by a calibration process or simulation or some other method.

Optionally, the evaluation unit is further configured to perform one or more of the following: to detect or to cause a braking actuation on the second axle, to control the load distribution mechanism, during the braking actuation, to lift the second axle, to determine the change in the slip value in response to the braking actuation. The detection of braking may include receiving a respective brake signal, and causing a braking may include issuing a respective brake signal that triggers a brake actuation.

The slip sensor may be configured to determine a first slip value for at least one wheel on the first axle. Then, optionally, the evaluation unit is further configured to perform one or more of the following: to detect or to cause a drive torque being applied to the first axle, to control the load distribution mechanism, during the acceleration, to lift the second axle, to determine the change in the slip value in response to the applied drive torque.

The slip sensor may be configured to determine a second slip value for at least one wheel on the second axle. Then, optionally, the evaluation unit is further configured to perform one or more of the following: to detect or to cause a braking actuation on the second axle at a same time as the drive torque is applied to the first axle, to control the load distribution mechanism, during the braking actuation and the application of the drive torque, to lift the second axle, to evaluate the road friction based on changes in the first slip value and in the second slip value in response to the braking actuation and to the applied drive torque. In this embodiment, the speed of the vehicle may not change. The vehicle may remain in a steady state.

The slip sensor may be configured to determine a first slip value for at least one wheel on the first axle and a second slip value for at least one wheel on the second axle. Then, optionally, the evaluation unit is further configured to perform one or more of the following: to determine a first change of the first slip value and a second change of the second the slip value in response to the change of the load and to evaluate the road friction based on the first change and the second change.

The commercial vehicle may further comprise an activation means to initiate the determination of the road friction. Then, optionally, the evaluation unit is further configured to receive from the activation means a signal for determining the road friction and based thereon to determine the road friction. The activation means may be manually activated by the driver or triggered by a control unit of the vehicle (e.g. controlling an autonomous driving operation).

Optionally, the evaluation unit is further configured to block the evaluation of the road friction during a critical situation (e.g. a critical driving situation). The critical situation may include at least one of the following: a braking event above a predetermined threshold, a driving along curves, a presence of neighboring vehicles or people, in towns or villages, etc.

The commercial vehicle may include one or more environmental sensors for determining environment conditions, especially the temperature, rain, snow, wind, etc. Then, optionally, the evaluation unit is further configured to automatically evaluate the road friction (only) when the determined environment conditions indicate a critical situation (e.g. freezing and/or a wet road) and/or after predetermined time intervals, and/or to issue a warning signal about the automatic evaluation of the road friction. The warning signal may also be issued in advance to allow the driver to prevent the automatic evaluation of the road friction.

The commercial vehicle may include a first slip sensor for a wheel on the first axle and a second slip sensor for a wheel on the second axle. Then, optionally, the evaluation unit is further configured to perform one or more of the following: to determine changes in slip values for the wheel on the first axle and for the wheel on the second axle (for which the load may be different), and to evaluate the road friction based on at least one difference in slip values (or changes) determined for the wheel on the first axle and for the wheel on the second axle.

Embodiments relate also to a vehicle, especially a commercial vehicle, comprising a first axle and a second axle, a load distribution mechanism for changing a load on the second axle, and a slip sensor for determining a slip value for at least one wheel on the first axle or on the second axle, and an apparatus for determining the road friction as defined before.

Embodiments relate also to a method for determining a road friction for a commercial vehicle. The commercial vehicle comprises again a first axle and a second axle, a load distribution mechanism for changing a load on the second axle, and a slip sensor for determining a slip value for at least one wheel on the first axle or on the second axle. The method comprises:
- controlling the load distribution mechanism to change the load of the first and/or second axle;
- determining a change in the slip value in response to the change of the load; and
- evaluating the road friction based on the change in the slip value.

This method may also be implemented in software or a computer program product and the order of steps may not be important to achieve the desired effect. Embodiments of the present invention can, in particular, be implemented by software or a software module in an electronic control unit. Therefore, an embodiment relates also to a computer program having a program code for performing the method, when the computer program is executed on a processor.

Some examples of the systems and/or methods will be described in the following by way of examples only, and with respect to the accompanying figures.

DETAILED DESCRIPTION OF THE DRAWINGS

Figure 1:
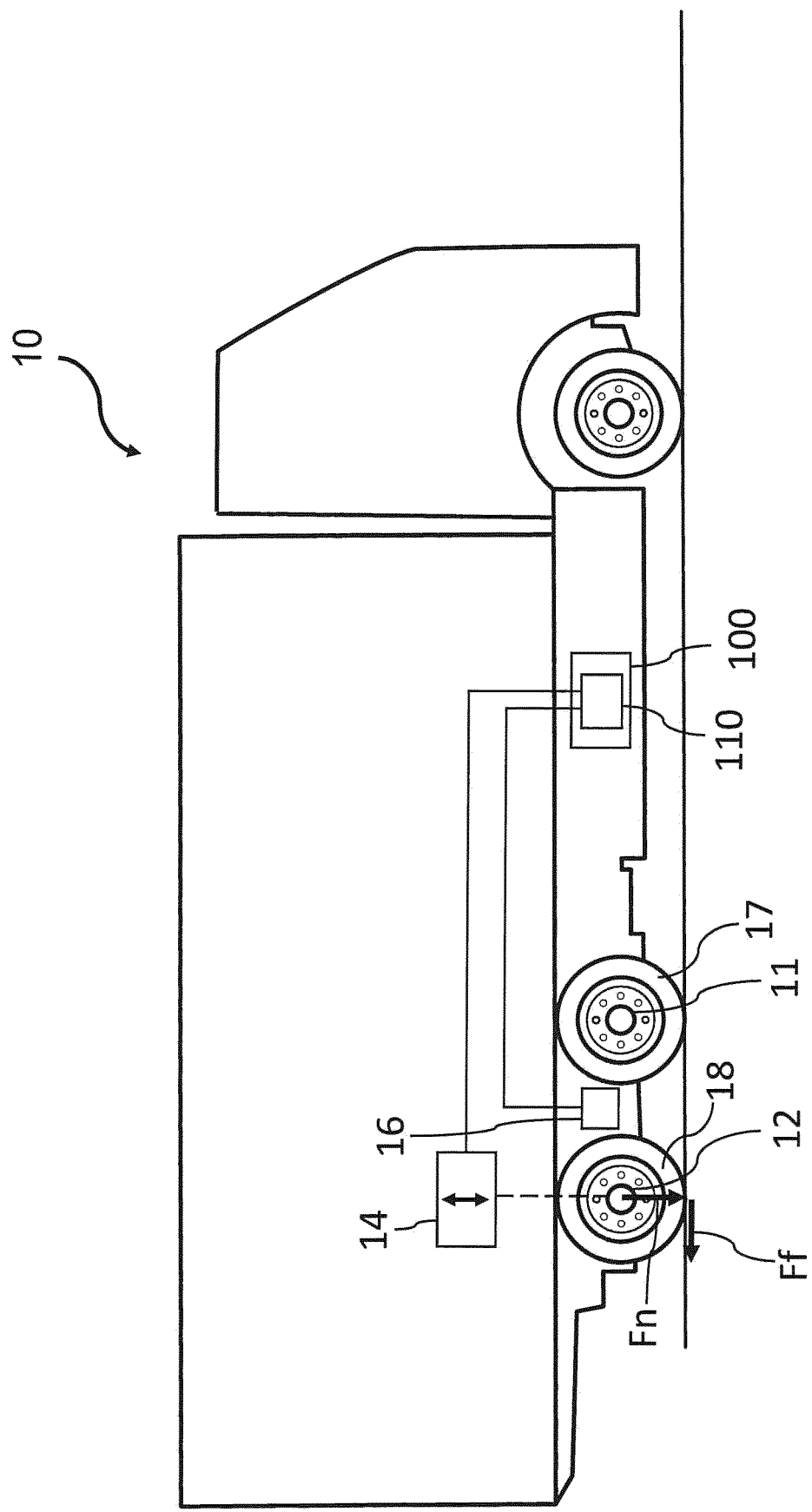
FIG. 1 depicts a vehicle with an apparatus according to an embodiment of the present invention.

FIG. 1 depicts an exemplary commercial vehicle 10 with an apparatus 100 according to embodiments. The vehicle 10 comprises a first axle 11 and a second axle 12, a load distribution mechanism 14 for changing a load Fn on the second axle 12, and a slip sensor 16 configured to determine a slip value for at least one wheel 17, 18 on the first axle 11 and/or on the second axle 12. The load Fn is nothing but a force acting on ground and determines the friction force. When the road is perpendicular to gravity the force caused by the load Fn is the normal force entering the road friction force $Ff=\mu*Fn$, where $\mu$ is the friction coefficient which is to be determined and which correlates to the slip. The friction depends on many parameters which are vehicle specific such as the tires or road specific such as the road material or the degree of moisture, ice, etc.

The apparatus 100 is configured to determine the road friction Ff for the vehicle 10 and includes an evaluation unit 110 and may control the load distribution mechanism 14 to change the load Fn of the second axle 12. After this, the evaluation unit 110 may determine a change in the slip value in response to the change of the load Fn. Finally, the evaluation unit 110 may evaluate the road friction Ff based on the change in the slip value.

It is understood that the vehicle 10 may comprise more than two axles 11, 12, in which case at least one of them may be liftable to modify the load Fn in a controlled way. Likewise, the liftable axle(s) may also belong to a trailer and not to a tractor for the trailer. These axle(s), too, may be used in embodiments to determine the road friction. Therefore, embodiments shall not be restricted on particular axles or on particular vehicles, but can be applied on any vehicle whether it is a tractor, trailer, single vehicle, vehicle combination, etc.

Therefore, embodiments are applicable for any vehicle or vehicle combination with more than two axles, where at least one of the axles can be lifted resulting in a dynamically adjustable load Fn, not only on this axle 12, but also on the other axle 11 that has to absorb the released load on the lifted axle 12. In other words, embodiments are particularly applicable on vehicles 10 where the load Fn on some wheels 17, 18 is controllable individually so that the load Fn on one of the axles (or the respective wheels) can be reduced or increased. This load increase/reduction may be performed during driving (in a steady state) or prior/during a braking or an acceleration.

The road friction Ff can be determined because, if the load Fn on a particular axle 11, 12 is changed, the given wheels 17, 18 will have a different adhesion utilization using the same or even less braking torques or driving torques. This results in a variation of the slip that can be measured and embodiments use the measured slip change to determine the road friction Ff.

According to embodiments, the evaluation unit 110 is configured to control the load change through the load distribution mechanism 14 such that the corresponding wheels 18 on the axle 12 whose load is changed becomes critical implying a transition from an adhesion friction and starting a sliding friction. This criticality can improve significantly the precision of the friction estimation. Since the wheels 17 on the other axle(s) 11 are not even close to the limits of the road friction, the vehicle operation is nevertheless safe. No critical driving situation is caused by the determination of the road friction according to embodiments.

According to further embodiments, the evaluation unit 110 is configured to cause a combined application of a braking torque and a driving torque at the same time to excite the tires 17, 18 during a steady state of the vehicle 10. For example, the first axle 11 may be a driven axle on which the drive torque can be applied while the wheels 18 on the second axle 12 are braked (and while this axle 12 may be lifted to some extend). The braking torque and the driving torque may be adjusted so that the speed of the vehicle 10 does not change during this operation. In particular, if the load Fn is reduced on the non-driven, second, axle 12, a lower excitation torque (braking and/or driving) can be applied for the same effect. This has also the advantage that the amount of energy used for this operation is reduced.

Embodiments are in particular applicable to so-called 6×2 trucks, where only one of the three axles are driven (first axle 11) and the other one can be lifted (second axle 12) as depicted in FIG. 1. The load distribution may be utilized by air bellows. When using the air bellows, the pressure in the air bellows can be reduced before braking to lift the second axle 12. It may be maximal until the driven axle 11 reaches the maximum allowed load Fn. According to embodiments, during braking, the tires of the lifted axle 12 will get near the adhesion limit implying the appearance of a significant wheel slip (above a predetermined threshold). According to embodiments, the evaluation unit 110 is configured to estimate the adhesion of the road surface with high precision from the differences in the load Fn and the slip values between the highly or fully-loaded driven axle 11 and the lightly-loaded lift axle 12.

According to yet another embodiment, on the same 6×2 truck, the load distribution mechanism 14 may also be configured to lift the driven axle 11 (instead of the second axle 12 or can lift both axles 11, 12, although not at the same time). The load distribution mechanism 14 may be configured to lift the driven axle 11 (or one of multiple driven axles). This lifting may be performed until a maximum is reached where the second axle 12 reaches the maximum allowed load during a normal driving operation. This may be achieved by reducing the air bellow pressure. The tires 17 on the driven axle 11 will get close to the adhesion limit (where the transition between adhesion and sliding friction occurs) resulting again in a significant amount of slip. As before, from the differences in the load Fn and slip of the highly or fully-loaded second axle 12 and the lightly-loaded driven axle 11 (here the lift axle), the adhesion of the surface can be estimated with high precision.

Although it may not be common to be able to lift a driven axle, on special vehicles (e.g. all-wheel drive) also driven axles may be liftable. In this case, usually the lifted driven axle may be either isolated from the drive train, or locked to the other axles, where no wheel speed difference can occur.

However, it may be possible to use the normal air bellows to change the load distribution between multiple driven axles. Therefore, the pressure on the driven axle may be decreased and/or increased on the other axle(s) resulting in an off-load of the driven axle(s) for the purpose of the measurement according to embodiments.

Figure 2:
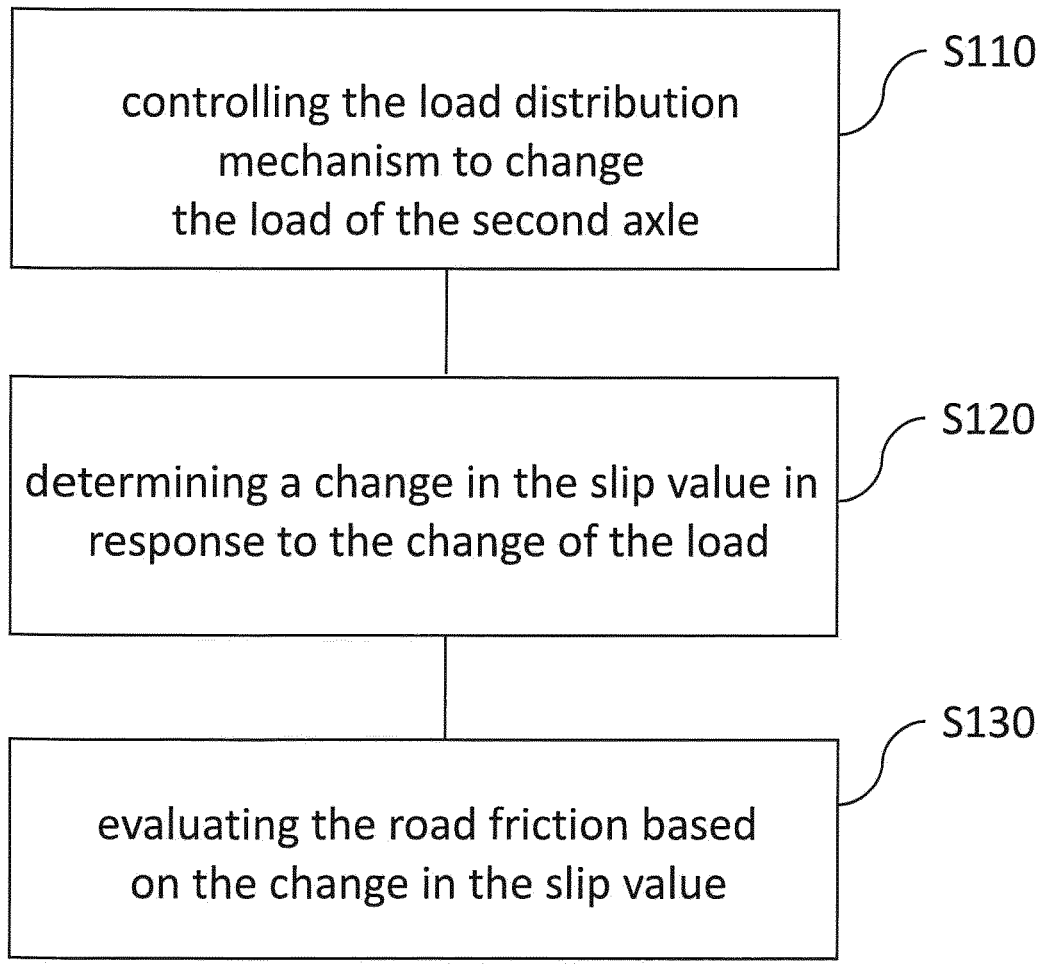
FIG. 2 depicts a schematic flow chart for a method of determining a road friction according to an embodiment of the present invention.

FIG. 2 depicts a flow diagram of a method for determining a road friction Ff of a commercial vehicle 10. The method comprises the steps of:
controlling S110 the load distribution mechanism 14 to change the load Fn of the first axle 11 and/or on the second axle 12;
determining S120 a change in the slip value in response to the change of the load Fn; and
evaluating S130 the road friction Ff based on the change in the slip value.

It is understood, according to further embodiments, that any function described before with the apparatus can be implemented as further optional method step. In addition, the order of method steps can be arbitrary as long as the desired result is achievable.

Moreover, this method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 10 commercial vehicle
11, 12 axles or axle group (at least two)
14 load distribution mechanism
16 slip sensor(s)
17, 18 wheels
100 apparatus for determining a road friction
110 evaluation unit
Ff road friction
Fn load

The invention claimed is:
1. An apparatus for determining a road friction of a commercial vehicle, the apparatus comprising:
an evaluation unit configured to cooperate with multiple components of the the commercial including: a first axle and a second axle, a load distribution mechanism for changing a load on the second axle or on the first axle, and a slip sensor configured to detect a slip value for at least one wheel on the first axle or on the second axle, wherein the evaluation unit is also configured to:

detect or cause a positive drive torque being applied to the first axle;
control the load distribution mechanism, during the application of the drive torque, to change the load of the second axle or on the first axle to lift the second axle or the first axle until there is a criticality characterized by a transition between adhesion friction and sliding friction on at least one wheel on the second axle;
determine a change in the slip value in response to the change of the load and the drive torque on the first axle; and
evaluate the road friction based on the change in the slip value.

2. The apparatus according to claim 1, wherein the evaluation unit is further configured to:
detect or cause a braking actuation on the second axle;
control the load distribution mechanism, during the braking actuation, to lift the second axle; and
determine the change in the slip value in response to the braking actuation.

3. The apparatus according claim 1, wherein
the slip sensor is configured to determine a second slip value for at least one wheel on the second axle, and
the evaluation unit is further configured to:
detect or cause a braking actuation on the second axle at a same time as the drive torque is applied to the first axle;
control the load distribution mechanism, during the braking actuation and the application of the drive torque, to lift the second axle; and
evaluate the road friction based on changes in the first slip value and in the second slip value in response to the braking actuation and to the applied drive torque.

4. The apparatus according to claim 1, wherein
the slip sensor is configured to determine first slip value for at least one wheel on the first axle and a second slip value for at least one wheel on the second axle, and
the evaluation unit is further configured to:
determine a first change of the first slip value and a second change of the second the slip value in response to the change of the load; and
evaluate the road friction based on the first change and the second change.

5. The apparatus according to claim 1, wherein
the commercial vehicle includes a first slip sensor for a wheel on the first axle and a second slip sensor for a wheel on the second axle, and
the evaluation unit is further configured to:
determine changes in slip values for the wheel on the first axle and for the wheel on the second axle; and
evaluate the road friction based on at least one difference in slip values determined for the wheel on the first axle and for the wheel on the second axle.

6. The apparatus according to claim 1, wherein
the evaluation unit is also configured to initiate the determination of the road friction, and
the evaluation unit is further configured to receive a signal for determining the road friction and based thereon to determine the road friction.

7. The apparatus according to claim 1, wherein
the evaluation unit is further configured to block the evaluation of the road friction during a critical situation, wherein the critical situation includes at least one of:
a braking event above a predetermined threshold,
a driving along curves,
a presence of vehicles or people in a vicinity of the commercial vehicle,
driving through towns or villages.

8. The apparatus according to claim 1, wherein
the commercial vehicle includes environmental sensors for determining environment conditions, and
the evaluation unit is further configured to:
automatically evaluate the road friction when the determined environment conditions indicate a critical situation or after predetermined time intervals; and
issue a warning signal about the automatic evaluation of the road friction.

9. A commercial vehicle, comprising:
a first axle and a second axle;
a load distribution mechanism for changing a load on the second axle;
a slip sensor for determining a slip value for at least one wheel on the first axle or on the second axle; and
an evaluation unit configured to:
detect or cause a positive drive torque being applied to the first axle;
control the load distribution mechanism, during the application of the drive torque, to change the load of the second axle or on the first axle to lift the second axle or the first axle until there is a criticality characterized by a transition between adhesion friction and sliding friction on at least one wheel on the second axle;
determine a change in the slip value in response to the change of the load and the drive torque on the first axle; and
evaluate the road friction based on the change in the slip value.

10. A method for determining a road friction of a commercial vehicle having a first axle and a second axle, the method comprising:
detecting or causing a positive drive torque being applied to the first axle;
controlling, during the application of the drive torque, a load distribution mechanism of the commercial to change a load of the second axle or on the first axle to lift the second axle or the first axle until there is a criticality characterized by a transition between adhesion friction and sliding friction on at least one wheel on the second axle;
determining, via a slip sensor of the commercial vehicle for determining a slip value for at least one wheel on the first axle or on the second axle, a change in the slip value in response to the change of the load and the drive torque on the first axle; and
evaluating the road friction based on the change in the slip value.

11. A computer program product comprising a non-transitory computer-readable medium having stored thereon program code which, when the program code is executed on a computer or processor, causes the acts of:
detecting or causing a positive drive torque being applied to a first axle of a commercial vehicle having the first axle and a second axle;
controlling a load distribution mechanism of the commercial vehicle to change a load of the second axle or on the first axle to lift the second axle or the first axle until there is a criticality characterized by a transition between adhesion friction and sliding friction on at least one wheel on the second axle;
determining, via a slip sensor of the commercial vehicle for determining a slip value for at least one wheel on the first axle or on the second axle, a change in the slip value in response to the change of the load and the drive torque on the first axle; and;

evaluating the road friction based on the change in the slip value.

* * * * *